United States Patent Office 3,775,383
Patented Nov. 27, 1973

3,775,383
ELECTRICALLY CONDUCTIVE POLYMERS AND PRODUCTION THEREOF
Hans Zweifel and Theodor Volker, Freiburg, Switzerland, assignors to Lonza Ltd., Gampel, Valais, near Basel, Switzerland
No Drawing. Filed May 12, 1972, Ser. No. 252,574
Claims priority, application Switzerland, Apr. 5, 1972, 4,948/72
Int. Cl. C08f 1/28, 3/48, 15/02
U.S. Cl. 260—78.4 R                       25 Claims

ABSTRACT OF THE DISCLOSURE

A process for the production of an electrically conductive polymer of maleic anhydride is disclosed. The process involves admixing maleic anhydride, dissolved in an organic solvent which is substantially anhydrous, with a trialkylphosphine, and polymerizing the maleic anhydride at a temperature between −40° and 140° C., whereby an electrically conductive polymer of maleic anhydride is formed.

The electrically conductive polymer of maleic anhydride contains cross conjugated keto olefin units. Also, the electrically conductive polymer is a semiconductor, which has a specific conductivity of about $1 \times 10^{-9}$ ohm per cm. at room temperature. The specific conductivity increases approximately linearly with increasing temperatures.

BACKGROUND OF THIS INVENTION

This invention relates to a process for the production of electrically conductive polymers of maleic anhydride. This invention further relates to a process for the production of polymerizing maleic anhydride using trialkyl phosphines. This also relates to the electrically conductive polymers so produced.

BROAD DESCRIPTION OF THIS INVENTION

This invention involves a process for the production of an electrically conductive polymer of maleic anhydride. The process includes admixing maleic anhydride, dissolved in an organic solvent which is substantially anhydrous, with a trialkylphosphine, and polymerizing the maleic anhydride at a temperature between −40° and 140° C., whereby an electrically conductive polymer of maleic anhydride is formed.

Each of the alkyl groups of the trialkylphosphine usually contain 1 to 18 carbon atoms. The preferred trialkylphosphine are triethylphosphine and tri-n-butyl phosphine. Usually 0.1 to 0.5 part by weight of the trialkyl phosphine, based on one part by weight of the maleic acid anhydride, is used.

This organic solvent preferably contains less than one percent by weight of water. The preferred solvents are benzene, toluene, tetrahydrofuran, dimethyl sulfoxide or dimethyl formamide.

This invention also involves electrically conductive polymers of maleic anhydride produced by the process of this invention. These polymers contain cross conjugated keto olefin units. These electrically conductive polymers are semi conductors, which have a specific conductivity of about $1 \times 10^{-9}$ ohm per cm. at room temperature. The specific conductivity increases approximately linearly with increasing temperatures.

The following theory is advanced to help explain applicants' invention, but it is not to restrict applicants' invention, in any manner if it is erroneous. It is assumed that during the polymerization of the maleic anhydride, initiated by trialkyl phosphine, a ylide is formed as an intermediate in a first step, which in a further step forms a monopolymer which contains cross conjugated keto olefin elements or units.

The polymers produced according to this invention, in which conjugated keto olefins elements are contained in the polymer chain, are distinguished by the fact that they possess paramagnetic characteristics and that they are electrically conductive. The following values show that the polymers of this invention are suitable semiconductors. The specific conductivity of the polymers of this invention is about $10^{-9}$ ohm per cm. at room temperature and increases linearly with increasing temperature. At about 70° C., the specific conductivity is, for example, already about $10^{-7}$ ohm per cm.

The following formula illustrate such polymers which have the cross conjugated keto olefin elements or units:

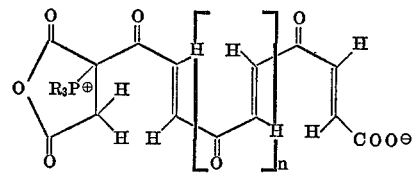

wherein $n$ is an integer greater than 50.

DETAILED DESCRIPTION OF THIS INVENTION

Maleic anhydride, OCOCH=CHCO can be formed by heating maleic acid, alone or with $P_2O_5$ or acetyl chloride.

The trialkyl phosphine, $R_3P$, acts as an initiator or catalyst for the polymerization of the maleic anhydride.

The trialkyl phosphine, $R_3P$, can contain the same or different alkyl groups. Each alkyl group can be a straight chain or branched chain alkyl group. Each alkyl group contains from 1 to 18 carbon atoms and preferably from 2 to 8 carbon atoms. The preferred trialkyl phosphines are triethyl phosphine (B.P.=128° C.) and tri-n-butyl phosphine. (It is known that the triethyl undergoes antioxidation in air much as phosphorus does.)

Essentially all trialkyl phosphines are insoluble in water and are soluble in ethanol and ether.

Trialkyl phosphines are quaternary compounds which are fairly basic in water.

Examples of useful trialkyl phosphines are: trimethyl phosphine (B.P.=42° C.), methyl ethyl butyl phosphine, dimethyl ethyl phosphine, tri-n-propyl phosphine, diethyl methyl phosphine, triisopropyl phosphine, tri-n-butyl phosphine, tri-n-amyl phosphine, triisobutyl phosphine, triisoamyl phosphine, tri-sec.-butyl phosphine, tri-n-hexyl phosphine, tri-ter.-butyl phosphine, triisohexyl phosphine, tri-sec.-amyl phosphine, tri-n-heptyl phosphine, tri(3-methyl-1-pentyl) phosphine, tri-n-nonyl phosphine, tri(2-methyl-1-pentyl) phosphine, tri-n-decyl phosphine, tri(2-ethyl-1-butyl) phosphine, tri-n-dodecyl phosphine, tri(3,3-dimethyl-1-butyl) phosphine, tri-n-tridecyl phosphine, tri-(2,3-dimethyl-1-butyl) phosphine, tri-n-tetradecyl phosphine, tri(2,4-dimethyl-1-pentyl) phosphine, tri-n-pentadecyl phosphine, tri(1-octanyl) phosphine, tri-n-hexadecyl phosphine, tri-n-hendecyl phosphine, tri-n-octadecyl phosphine and tri-n-heptadecyl phosphine.

From 0.01 to 0.5 part by weight of trialkyl phosphine, based on one part by weight of maleic anhyldride, is used.

The solvent should be anhydrous or as free of water as possible. In most cases the solvent should not contain more than 5 percent water, preferably not more than 1 percent water, and most preferably not more than 0.1 percent water. The solvents can be dried (water removed) by any convenient and conventional method prior to use in this invention.

The solvent must be inert to the polymerization reaction, the monomer, polymer and initiator.

The solvent should be liquid over the entire temperature range of −40° to 140° C., but solvents can be used which are liquid or part of that temperature range.

Any solvent can be used which is capable of dissolving the monomer and initiator in sufficient quantity, without reacting with them. The most preferred solvents are benzene, toluene, tetrahydrofuran, dimethyl sufoxide and dimethyl formamide. Other solvents include diethylformamide, diethylsulfoxide, di-n-propylsulfoxide, di-n-propylsulfoxide, and lower alcohols.

As used herein conjunction with the solvent, the term aromatic hydrocarbon includes, benzene, homologs of benzene and aromatic compounds with condensed rings.

Examples of homologs of benzene which can be used as a solvent for the components are toluene, o-xylene, m-xylene, p-xylene, 1,2,3-trimethylbenzene, 1,2,3-trimethylbenzene, 1,3,4-trimethylbenzene, n-propylbenzene, isopropylbenzene, p-methylisopropylbenzene, 1,2,4,5-tetramethylbenzene, pentamethylbenzene, ethylbenzene, 1-phenylpentane, 2-methyl-2-phenylbutane, 2-phenylbutane, nonyl toluene, o-butyl touluene, 3,5-diethyl toluene, m-butyl toluene, p-ethyl toluene, p-butyl toluene, o-ethyl toluene, o-propyl toluene, m-ethyl toluene, m-propyl toluene, 1,2-diethylbenzene, p-propyl toluene, 1,3-diethylbenzene, isobutylbenzene, 1,4-diethylbenzene, 1-ethyl-4-isobutylbenzene, 1-ethyl-3-isopropylbenzene, 1-ethyl-4-isopropylbenzene, isoamylbenzene, isohexylbenzene, pentaethylbenzene, vic-tetraethylbenzene, pentamethylbenzene, sym-tretraethylbenzene, 1,3,5-triethylbenzene and 1,2,4-triethylbenzene.

Examples of aromatic compounds with condensed rings which are useful as a solvent for the reactants are indene, naphthalene, 1-ethyl naphthalene, acenaphthalene, 1-methyl naphthalene, and 2-methyl naphthalene.

Illustrations of heterocyclic compounds which are solvents are tetrahydrofuran, tetrahydrofural, 2-(chloromethyl)tetrahydrofuran, 2-butoxymethyltetrahydrofuran, 2-ethoxymethyl-tetrahydrofuran, tetrahydropyrane, tetrahydrofurfuryl bromide, 2 - alkyl-tetrahydropyranes, 2,3-dibromo-tetrahydropyrane, 2-methoxytetrahydropyrane, 2-bromo-tetrahydropyrane and pyrrolidine.

Other useful solvents are, for example: carbon tetrachloride, diethanolamine, diethyl Cellosolve, diethyl aniline, ethyl thiocyanate, capryl alcohol, 2-amino-2-methyl-1-propanol, isoamyl sulfide, methyl disulfide and pyridine.

Mixtures of solvents can be used.

The following examples illustrate the invention. All percentages, parts and ratios used in the examples and this application are on a weight basis unless otherwise stated or obvious to one ordinarily skilled in the art.

EXAMPLE 1

100 gm. of maleic anhydride were dissolved in 450 ml. of tetrahydrofuran (dried) and cooled to −40° C. 50 gm. of triethyl phosphine are added (drop by drop). The admixture is stirred overnight at about −40° C. The next day the mixture was heated to room temperature, then the solvent was distilled off at standard pressure. The resultant black resin was dried under high vacuum at $10^{-3}$ mm. Hg and 80° C. The residue was purified by cold extraction with ether. The product had a specific electrical conductivity of about $10^{-9}$ ohm at room temperature, which increased linearly with increasing temperature. The infrared spectrum of the product showed existence of cross conjugated keto olefin units.

EXAMPLE 2

Example 1 was repeated except that the solvent was 2-ethoxymethyltetrahydrofuran and that the polymerization temperature was 140° C. An electrically conductive polymer was obtained.

EXAMPLE 3

Example 1 was repeated except that the triethyl phosphine was replaced with trimethyl phosphine. An electrically conductive polymer was obtained.

EXAMPLE 4

Example 1 was repeated except that the triethyl phosphine was replaced with tri-n-nonyl phosphine. An electrically conductive polymer was obtained.

EXAMPLE 5

100 gm. of maleic acid anhydride were dissolved in 450 ml. of benzene (dried) and were cooled to −40° C. 25 gm. of tri-n-butyl phosphine were added (all at once). This admixture was brought up over a two hour period to room temperature with gradual heating. The solvent was distilled off at standard pressure. The resultant black resin was dried at $10^{-3}$ mm. Hg and 70° C. The residue was extracted cold with ether. The product had a specific electrical conductivity of about $10^{-9}$ ohm (with linear conductivity/temperature characteristic), and its infrared spectrum was identical to that of the product of Example 1.

EXAMPLE 6

Example 5 was repeated except that the tri-n-butyl was replaced with diethyl methyl phosphine. An electrically conductive polymer was obtained.

EXAMPLE 7

100 gm. of maleic acid anhydride was dissolved in 300 ml. of tetrahydrofuran (dried). This admixture was heated to about 70° C. 5 gm. of tri-n-butyl phosphine were added (drop by drop) while stirring. The solvent was distilled off at standard pressure. The resultant resin was dried at $10^{-3}$ mm. Hg. The residue was extracted cold with ether. The product had a specific electrical conductivity of $10^{-9}$ ohm (with linear conductivity/temperature characteristic), and its infrared spectrum was identical to that of the product of Example 1.

EXAMPLE 8

Example 7 was repeated except that the tri-n-butyl phosphine was replaced with triisopropyl phosphine. An electrically conductive polymer was obtained.

EXAMPLE 9

Example 7 was repeated except that 1 gm. of tri-n-butyl phosphine was used. An electrically conductive polymer was obtained.

EXAMPLE 10

100 gm. of maleic acid anhydride were dissolved in 200 ml. of dimethyl sulfoxide (dried). This admixture was heated to 60° C. 10 gm. of triethyl phosphine were added (drop by drop) while stirring. The solvent was distilled off at 10 mm. Hg. The resultant resin was dried at $10^{-3}$ mm. Hg and 100° C. The residue was extracted cold with ether. The product had a specific electrical conductivity of about $10^{-9}$ ohm (with linear conductivity/temperature characteristic) and its infrared spectrum was identical to that of the product of Example 1.

EXAMPLE 11

Example 10 was repeated except that the solvent was dimethyl formamide. An electrically conductive polymer was obtained.

EXAMPLE 12

Example 10 was repeated except that the solvent was toluene. An electrically conductive polymer was obtained.

EXAMPLE 13

100 gm. of maleic acid anhydride were dissolved in 450 ml. of tetrahydrofuran (dried). This admixture was cooled to about −40° C. 20 ml. of tri-n-butyl phosphine was added (all at once). With continued stirring, the mixture was gradually heated to room temperature over a 5 hour period. 380 ml. of the solvent was distilled off at standard pressure. The resultant viscous resin was spread onto a glass slide (as carrier). The coated slide was dried at 150° C. and $10^{-2}$ mm. Hg. A black homogeneous film formed which had a specific electrical conductivity of $10^{-9}$ ohm. The infrared spectrum of this film was identical to that of the product of Example 1.

Another embodiment of this invention encompasses the polymerization of substituted maleic anhydrides using the above-described process and conditions. The resultant polymers are electrically conductive. The maleic anhydride can be substituted with halogens, such as, F, Br, I and Cl, and lower alkyl groups having one to four carbon atoms. Examples of substituted maleic anhydrides are bromo maleic anhydride, chloro maleic anhydride, and methyl maleic anhydride.

Another embodiment of this invention encompasses the use of other monomers to form copolymers with maleic anhydride or substituted maleic anhydride using the above-described process and conditions. Up to 20 percent of the other monomers can be used. Examples of other monomers are itaconic anhydride, and $\alpha,\alpha'$-dimethyl glutaconic anhydride. The resultant copolymers are electrically conductive.

What we claim is:

1. A process for the production of an electrically conductive polymer of maleic anhydride which comprises admixing maleic anhydride, dissolved in an organic solvent, which is substantially anhydrous, with a trialkylphosphine, said trialkylphosphine containing alkyl groups which each contain from 1 to 18 carbon atoms, and polymerizing said maleic anhydride at a temperature between $-40°$ and $140°$ C., whereby said electrically conductive polymer of maleic anhydride is formed.

2. A process as described in claim 1 wherein said trialkylphosphine contains alkyl groups which each contain from 2 to 8 carbon atoms.

3. A process as described in claim 1 wherein said trialkylphosphine is triethylphosphine.

4. A process as described in claim 1 wherein said trialkylphosphine is tri-n-butyl phosphine.

5. A process as described in claim 1 wherein said organic solvent contains less than one percent by weight of water.

6. A process as described in claim 1 wherein said solvent is benzene, toluene, tetrahydrofuran, dimethyl sulfoxide or dimethyl formamide.

7. A process as described in claim 1 wherein 0.1 to 0.5 part by weight of said trialkyl phosphine, based on one part by weight of said maleic acid anhydride, is used.

8. A process as described in claim 1, wherein said admixture is achieved at a temperature between $-40°$ and $140°$ C.

9. A process for the production of an electrically conductive polymer of maleic anhydride which consists of admixing maleic anhydride, dissolved in an organic solvent which is substantially anhydrous, with a trialkylphosphine, said trialkylphosphine containing alkyl groups which each contain from 1 to 18 carbon atoms, and polymerizing said maleic anhydride at a temperature between $-40°$ and $140°$ C., whereby said electrically conductive polymer of maleic anhydride is formed.

10. A process as described in claim 9 wherein said trialkylphosphine contains alkyl groups which each contain from 2 to 8 carbon atoms.

11. A process as described in claim 9 wherein said trialkylphosphine is triethylphosphine.

12. A process as described in claim 9 wherein said trialkylphosphine is tri-n-butyl phosphine.

13. A process as described in claim 9 wherein said organic solvent contains less than one percent by weight of water.

14. A process as described in claim 9 wherein said solvent is benzene, toluene, tetrahydrofuran, dimethyl sulfoxide or dimethyl formamide.

15. A process as described in claim 9 wherein 0.1 to 0.5 part by weight of said trialkyl phosphine, based on one part by weight of said maleic acid anhydride, is used.

16. A process as described in claim 9 wherein said admixture is achieved at temperature between $-40°$ and $140°$ C.

17. A process for the production of an electrically conductive polymer of maleic anhydride which comprises admixing maleic anhydride, or substituted maleic anhydride substituted with F, Br, I, Cl or an alkyl group having 1 to 4 carbon atoms or an admixture of up to 20 percent by weight of a comonomer with said maleic anhydride or said substituted maleic anhydride, dissolved in an organic solvent which is substantially anhydrous, with a trialkylphosphine, said trialkylphosphine containing alkyl groups with each contain from 1 to 18 carbon atoms, and polymerizing said maleic anhydride at a temperature between $-40°$ and $140°$ C., whereby said electrically conductive polymer of maleic anhydride is formed.

18. A process for the production of an electrically conductive polymer or maleic anhydride which consists of admixing maleic anhydride, or substituted maleic anhydride substituted with F, Br, I, Cl or an alkyl group having 1 to 4 carbon atoms or an admixture of up to 20 percent by weight of a comonomer with said maleic anhydride or said substituted maleic anhydride, dissolved in an organic solvent which is substantially anhydrous, with a trialkylphosphine, said trialkylphosphine containing alkyl groups which each contain from 1 to 18 carbon atoms, and polymerizing said maleic anhydride at a temperature between $-40°$ and $140°$ C., whereby said electrically conductive polymer of maleic anhydride is formed.

19. A process as described in claim 18 wherein said trialkylphosphine contains alkyl groups which each contain from 2 to 8 carbon atoms.

20. A process as described in claim 18 wherein said trialklyphosphine is triethylphosphine.

21. A process as described in claim 18 wherein said trialkylphosphine is tri-n-butyl phosphine.

22. A process as described in claim 18 wherein said organic solvent contains less than one percent by weight of water.

23. A process as described in claim 18 wherein said solvent is benzene, toluene, tetrahydrofuran, dimethyl sulfoxide or dimethyl formamide.

24. A process as described in claim 18 wherein 0.1 to 0.5 part by weight of said trialkyl phosphine, based on one part by weight of said maleic acid anhydride is used.

25. A process as described in claim 18 wherein said admixture is achieved at a temperature between $-40°$ and $140°$ C.

References Cited

UNITED STATES PATENTS

| | | | |
|---|---|---|---|
| 3,186,972 | 6/1965 | Lang et al. | 260—78.4 |
| 3,627,656 | 12/1971 | Miller | 204—159.24 |
| 3,457,240 | 7/1969 | Heuck et al. | 260—78.4 |
| 3,359,246 | 12/1967 | Berry | 260—78.4 |
| 3,203,886 | 8/1965 | Griffin | 204—158 |

JOSEPH L. SCHOFER, Primary Examiner

J. KNIGHT III, Assistant Examiner

U.S. Cl. X.R.

260—78.5 R